Aug. 29, 1967  G. A. KAPPENHAGEN ETAL  3,338,012
CORNER BRACKET FOR ELECTRICAL COMPONENT CABINET
Filed Sept. 15, 1965
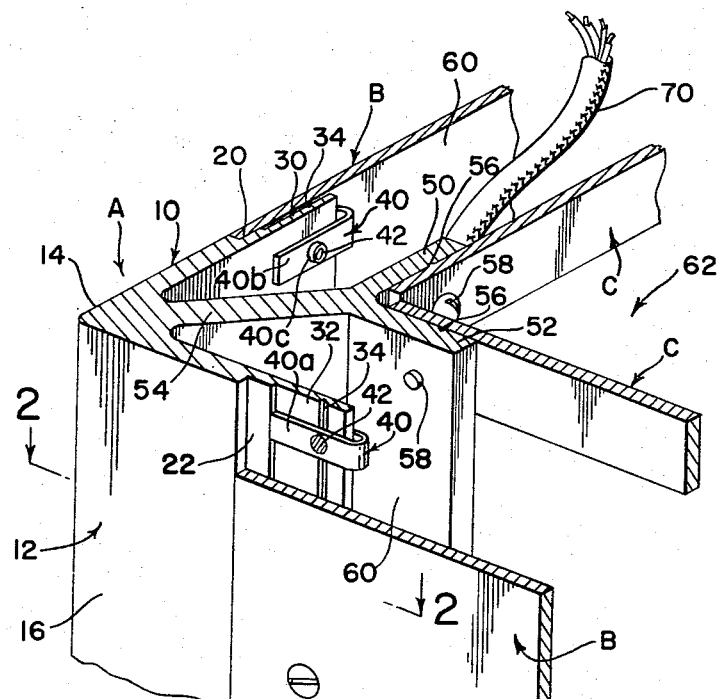
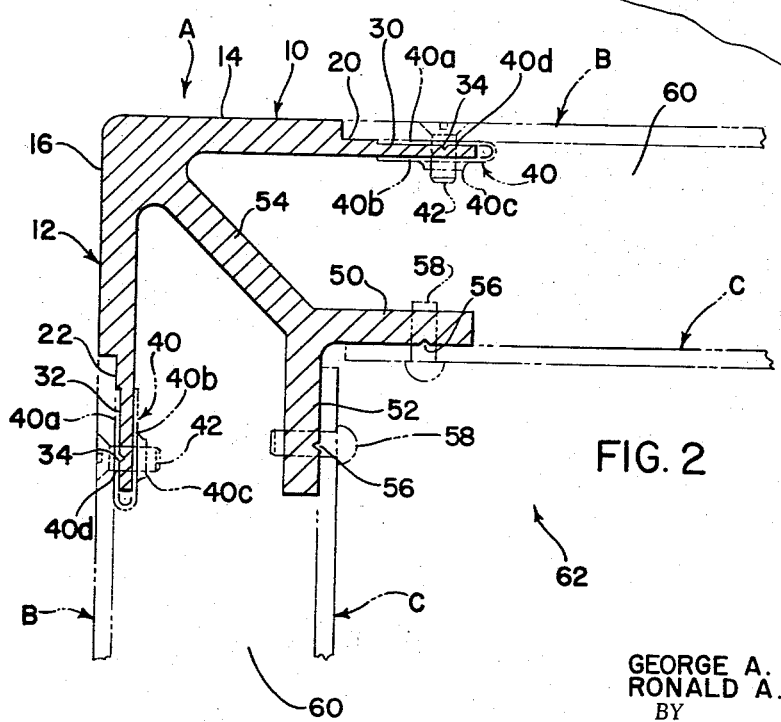
INVENTORS.
GEORGE A. KAPPENHAGEN &
RONALD A. MEERMANS
BY
*Tilberry & Body*
ATTORNEYS United States Patent Office 3,338,012
Patented Aug. 29, 1967

3,338,012
CORNER BRACKET FOR ELECTRICAL COMPONENT CABINET
George A. Kappenhagen and Ronald A. Meermans, Cleveland, Ohio, assignors to The Ohio Crankshaft Company, Cleveland, Ohio, a corporation of Ohio
Filed Sept. 15, 1965, Ser. No. 487,483
2 Claims. (Cl. 52—282)

This invention pertains to the art of cabinets of the type used for housing electrical components, such as high frequency oscillators for induction heating, and more particularly to a corner bracket for such an electrical component cabinet.

The present invention is particularly applicable for use with a cabinet for a high frequency oscillator used in induction heating, and it will be described with particular reference thereto; however, it will be appreciated that the invention has somewhat broader applications and it may be used in other electrical component cabinets having somewhat the same requirements as an oscillator cabinet.

In the past cabinets for high frequency oscillators, and other such electrical components, have been constructed by building a metal framework or skeleton and attaching metal cover panels onto the framework by welding or by mechanical fasteners, such as bolts or screws. The cover panels were formed from thin sheet metal, and they were joined at the corners by lapped joints or butt joints. These joints were somewhat unsightly, and they had to be accurately formed to provide flat, smooth corners on the cabinet. In addition, considerable effort was required to prevent dangerous, sharp edges at the joint between adjacent side panels. It was also found that quite often the connections between the panels and the framework required access to the interior of the cabinet. Sometimes this was somewhat difficult, especially when various components were mounted within the framework before the panels were secured in place onto the framework.

All of these disadvantages, and others, of prior cabinets for electrical components, such as high frequency oscillators, are completely overcome by the present invention which is directed toward a novel corner bracket for such a cabinet which bracket greatly simplifies the construction of the cabinet and improves the outward appearance of the assembled cabinet.

In accordance with the present invention, there is provided a corner support bracket for the spaced vertical and horizontal corners of an electrical component cabinet having outwardly facing sheet metal cover panels. This bracket comprises a unitary, extruded metal body having two orthogonal, outer mounting flanges with outwardly facing decorative surfaces, each flange having a longitudinally extending recess with a depth corresponding to the thickness of the cover panel extending from the corner bracket to an adjacent corner bracket, and fastening means on each of the outer flanges for mounting the panels in the recesses. Also, the bracket includes two orthogonal, inner support flanges, fastening means on each of the inner flanges for mounting struts extending between adjacent spaced corner brackets, and a connector rib extending between the intersecting edges of the inner and outer flanges to join the inner and outer flanges into a unit.

The primary object of the present invention is the provision of a corner support bracket for the spaced corners of a cabinet for an electrical component, such as a high frequency oscillator used for induction heating, which bracket provides an improved joint between adjacent cover panels of the cabinet and is formed by a unitary extruded element.

Another object of the present invention is the provision of a corner support bracket for the spaced corners of a cabinet for an electrical component, such as a high frequency oscillator used for induction heating, which bracket allows easy installation of the sheet metal cover panels assembled around the periphery of the cabinet.

Still another object of the present invention is the provision of a corner support bracket for the spaced corners of a cabinet for an electrical component, such as a high frequency oscillator used for induction heating, which bracket provides an inexpensive and economical corner construction.

Yet another object of the present invention is the provision of a corner support bracket for the spaced corners of a cabinet for an electrical component, such as a high frequency oscillator used for induction heating, which bracket produces a pleasing outer appearance.

Yet another object of the present invention is the provision of a corner support bracket for the spaced corners of a cabinet for an electrical component, such as a high frequency oscillator used for induction heating, which bracket provides an internal peripheral space to accommodate various accessory elements, such as electrical cables and coolant hoses.

These and other objects and advantages will become apparent from the following description used to illustrate the preferred embodiment of the invention as read in connection with the accompanying drawing in which:

FIGURE 1 is a pictorial view illustrating the preferred embodiment of the present invention; and FIGURE 2 is a cross-sectional view taken generally along line 2—2 of FIGURE 1.

Referring now to the drawing wherein the showings are for the purpose of illustrating a preferred embodiment of the invention only and not for the purpose of limiting same, FIGURES 1 and 2 show an elongated corner bracket A formed from metal, such as aluminum, and utilized for forming the corners between cover panels B of an electrical component cabinet. For the purpose of simplicity, the complete cabinet is not illustrated, and it should be appreciated that the structure shown in the figures is generally applied to all four vertical corners of a cabinet and the horizontal corners of the cabinet. The length of the brackets generally corresponds to the length of the corner. The corner brackets A also provide support for transversely extending struts C which are used to mount various components within the cabinet and to reinforce the cabinet. In practice, the struts C form the framework of the cabinet; however, other structures could be used with the struts for this purpose.

Referring now in more detail to the elongated, extruded bracket A, this bracket is provided with orthogonal outer flanges 10, 12 which are adapted to receive the cover panels B for closing the cabinet. Outer flanges 10, 12 are provided with outwardly facing decorative surfaces 14, 16, respectively, which surfaces are anodized or otherwise treated to provide the desired color or decoration for the visible portions of the bracket. Extending longitudinally along flanges 10, 12 are recesses 20, 22, respectively. These recesses have a depth substantially equal to the thickness of the cover panels B so that the cover panels may be received within the recesses to provide a continuous outer appearance at the joint area between adjacent panels.

In accordance with the illustrated embodiment of the present invention, the outer flanges are provided with recesses 30, 32 extending along recesses 20, 22 and providing a relieved outermost portion for the flanges. Grooves 34, extending longitudinally in recesses 30, 32, provide a locating arrangement for holes or apertures which are required to secure the panels B onto the brackets A. A plurality of U-shaped speed nuts 40 having somewhat parallel legs 40a, 40b, outwardly tapering locking aperture 40c, and a clearance aperture 40d are used to secure the panels onto the brackets. The depth of the recesses 30, 32 is at least as great as the thickness of leg 40a of speed-nuts 40 so that these legs of the various speed-nuts may be placed within the recesses 30, 32 without interfering with the attachment of the panels within the recesses 20, 22.

Assembly of the panels B onto the brackets A is accomplished by first drilling a series of appropriately sized, spaced apertures through flanges 10, 12 at grooves 34. The U-shaped speed-nuts 40 are then slipped over the end of the flanges with the legs 40a within one of the recesses 30, 32 and with the apertures 40c, 40d being generally aligned with one of the apertures within the grooves 34. Thereafter, at each nut 40 a screw 42 is passed through a previously provided opening in the cover panel B, through clearance aperture 40d, through the aperture within one of the grooves 34 and then into the locking aperture 40c. The locking aperture is so constructed that the screw 42 may be tightened down to hold the panels in position on the flanges 10, 12. It is appreciated that the recesses 30, 32 could be individual or separate indentations within the recesses 20, 22; however, to facilitate manufacture by extrusion of aluminum or a similar material without substantial post extrusion processing, the longitudinally extending recesses 30, 32 are preferred. In the manner described, the panels B are conveniently affixed onto the brackets A with the brackets having a pleasing outer appearance which does not require overlapping or abutting of adjacent panels B.

Referring again to the corner bracket A, the bracket is provided with inner, longitudinally extending support flanges 50, 52 which are connected onto flanges 10, 12 by an integral web 54. Longitudinally extending grooves 56 are provided within the inner surface of flanges 50, 52 so that apertures may be drilled and tapped in these grooves to receive bolts 58. The grooves 56 provide vertical alignment for these drilled and tapped holes. The bolts 58 secure the support struts C within the interior of the cabinet and, in effect, divide the cabinet into an outer peripheral space 60 and an inner space 62. The space 62 is utilized for the various components which are to be mounted within the cabinet. The peripheral spaces 60 provide clearance for the location of electrical cables, such as cable harness 70, coolant hoses (not shown), and other accessories to be utilized by the component within the cabinet.

It is appreciated that the electrical components may be supported within the cabinet on the various struts C or on elements connected to these struts. Thereafter, the necessary accessories can be placed within the space 60 and the thin metal panels B can be conveniently positioned onto the cabinet. This provides a convenient arrangement for assembling an electrical component, such as a high frequency oscillator used for induction heating operations. It is also possible to mount various components on the flanges 50, 52 in-between the support struts C without departing from the intended spirit and scope of the present invention.

The corner brackets A along the vertical corners are mitered to match similarly mitered ends of the brackets along the horizontal corners. This mitered construction enhances the overall strength and rigidity of the cabinet. In addition, the use of aluminum for the brackets decreases electrical losses by reducing heating of the brackets when an R-F oscillator is housed within the cabinet.

The present invention has been described in connection with one structural embodiment; however, it should be appreciated that various changes may be made in this embodiment without departing from the intended spirit and scope of the present invention as defined in the appended claims.

Having thus described our invention, we claim:

1. A corner support bracket for the spaced corners of an electrical component cabinet with outwardly facing sheet metal cover panels, said bracket comprising a unitary, extruded metal body having:
    (a) two orthogonal, outer mounting flanges with outwardly facing decorative surfaces, each flange having a longitudinally extending recess with a depth corresponding to the thickness of the cover panel extending from said bracket to an adjacent bracket, and fastening means on each of said outer flanges for mounting said panels in said recesses;
    (b) two orthogonal, inner support flanges and fastening means on each of said inner flanges for mounting struts extending between adjacent spaced brackets; and,
    (c) a connector rib extending between the intersecting edges of said inner and said outer flanges to join said inner and said outer flanges into a unit;
    (d) each of said outer flanges including an indentation coextensive with said recess and having a depth corresponding to approximately the thickness of one leg of a U-shaped speed-nut which forms said fastening means for said panels, said speed-nut being slipped over said outer flange with one leg in said indentations without interfering with said cover panel.

2. A corner support bracket as defined in claim 1 wherein said recess of each of said outer flanges includes a longitudinally extending groove for locating said fastening means on said outer flanges.

References Cited
UNITED STATES PATENTS

| | | | |
|---|---|---|---|
| 2,401,202 | 5/1946 | Tinnerman | 151—41.75 X |
| 2,672,905 | 3/1954 | Hartman et al. | 151—41.75 |
| 2,975,227 | 3/1961 | Wiater et al. | 52—282 X |
| 3,042,158 | 7/1962 | Michaels | 52—470 X |
| 3,066,773 | 12/1962 | Raidel | 52—470 X |
| 3,125,194 | 3/1964 | Kimmel et al. | 52—282 |
| 3,157,255 | 11/1964 | Sonheim | 52—282 X |
| 3,190,408 | 6/1965 | Petterson | 52—282 X |

FRANK L. ABBOTT, *Primary Examiner.*

R. S. VERMUT, *Assistant Examiner.*